United States Patent Office 3,468,946
Patented Sept. 23, 1969

3,468,946
PHOSPHORIC TRIAMIDE DERIVATIVES
Horst O. Bayer, Levittown, and Sheldon N. Lewis and Victor H. Unger, Willow Grove, Pa., assignors to Rohm & Haas Company, Philadelphia, Pa., a corporation of Delaware
No Drawing. Filed Oct. 20, 1965, Ser. No. 499,045
Int. Cl. C07f 9/52; A01n 9/36
U.S. Cl. 260—543           4 Claims

ABSTRACT OF THE DISCLOSURE

Herbicidal compositions comprising, as the active ingredient contained therein, novel halophosphonium salts of the formula

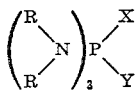

are useful for the selective control of the growth of weeds in an agronomic crop.

---

This invention is concerned with derivatives of phosphoric triamide, $(NH_2)_3P=O$, which exhibit outstanding herbicidal properties. In particular the invention deals with these phosphoric triamide derivatives as new compounds, herbicidal compositions containing them, and with their use in controlling weeds.

The active compounds of this invention may be represented by the formula

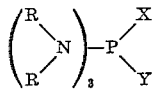

wherein R is alkyl of 2 to 6 carbon atoms, alkenyl of 2 to 6 carbon atoms and when the two R's are taken together with the N atom they may be pyrrolidinyl or piperidinyl and X and Y individually may be fluoro, chloro, bromo, iodo or fluoborate.

Representative compounds of this invention are:

tris(diethylamido)chlorophosphonium fluoride
tris(di-n-propylamido)chlorophosphonium chloride
tris(di-isobutylamido)chlorophosphonium bromide
tris(di-n-pentylamido)chlorophosphonium iodide
tris(di-n-hexylamido)chlorophosphonium fluoborate
tris(diallylamido)fluorophosphonium bromide
tris(di-3-butenylamido)bromophosphonium bromide
tris(tetramethyleneamido)bromophosphonium iodide
tris(pentamethyleneamido)iodophosphonium fluoborate The halophosphonium salts of the structure

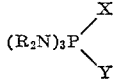

wherein X and Y may individually be fluoro, chloro, bromo, iodo or fluoborate may be made by several procedures.

(a) Reaction of $PCl_5$ with a secondary amine (1) $PCl_5 + 6R_2NH \rightarrow Cl(R_2N)_3P^+ \cdot Cl^- + 3R_2NH \cdot HCl$ The replacement of three of the Cl's of $PCl_5$ with $R_2N-$ groups is readily accomplished whereas the replacement of the fourth Cl is much more difficult. Although the $(R_2N)_3PCl_2$ compounds formed are subject to hydrolysis to the phosphoric triamides, they are sufficiently stable to be isolated and to be used as intermediates for making the chlorophosphonium salts $Cl(R_2N)_3P \cdot X$.

(b) Reaction of phosphoric triamides with $PCl_5$ or acid chlorides.

(2) $(R_2N)_3PO + PCl_5 \rightarrow (R_2N)_3PCl_2 + POCl_3$
  $(R_2N)_3PO + COCl_2 \rightarrow (R_2N)_3PCl_2 + CO_2$ (c) Halogenation of a phosphorous triamide (3) $(R_2N)_3P + X_2 \rightarrow (R_2N)_3PX_2$ where $X_2$ is bromine or iodine.

In some instances a halogen adduct of the halophosphonium halide is formed, such as $(R_2N)_3PX_4$, and requires dehalogenation to the $(R_2N)_3PX_2$ compound.

(d) Metathesis of $Cl(R_2N)_3P^+ \cdot Cl^-$ compounds with metal salts.

(4) $Cl(R_2N)_3P^+ \cdot Cl^- + $ Metal $X \rightarrow$
  $Cl(R_2N)_3P^+ \cdot X^- + $ Metal Cl The Metal X salts used are most often alkali metal salts, such as sodium and potassium salts. This method is used most often when the $Cl(R_2N)_3P^+ \cdot X^-$ compound is less water soluble than the corresponding chlorophosphonium chloride, and, of course, the metal chloride formed should be sufficiently water-soluble so as not to precipitate out of solution.

(e) Reaction of $(R_2N)_3PX_2$ compounds with silver fluoride.

(5) $(R_2N)_3PX_2 + AgF \rightarrow (R_2N)_3PXF + AgX$
  $(R_2N)_3PX_2 + 2AgF \rightarrow (R_2N)_3PF_2 + 2AgX$ The following illustrate typical preparative methods.

(A) Method of reaction 2.—Preparation of tris(dipropylamido)chlorophosphonium chloride, $(Pr_2N)_3P^+Cl \cdot Cl^-$ To 17.35 g. (0.05 mole) of hexa-n-propylphosphoric triamide was added 60 g. of a 12% solution of phosgene (0.05 mole) in benzene and the mixture was heated on a steam bath for 2 hours at 80° C. Carbon dioxide was generated. The solution was concentrated in a rotary evaporator and the residue was triturated with ether and filtered to give 10.5 g. of a hygroscopic white solid. It is a 52% yield of tris(dipropylamido)chlorophosphonium chloride. Its identity was confirmed by quantitative conversion by means of sodium iodide to the corresponding phosphonium iodide.

(B) Method of reaction 3.—Preparation of tris(dipropylamido)bromophosphonium bromide, $(Pr_2N)_3P^+Br \cdot Br^-$ To a cooled solution of 100 g. (0.301 mole) of hexa-n-propylphosphorous triamide in 300 ml. of dry ether was added 88 g. (0.55 mole) of elemental bromine over a period of 2 hours. The mixture was stirred at room temverature over night, then filtered and the solid washed with ether, ethanol and ether and dried to give 160 g. of orange-yellow solid melting at 88° to 90° C. This solid was found to contain by analysis 48.85% Br, 6.60% N, and 4.61% P; calculated for $C_{18}H_{42}Br_4N_3P$ is 49.10% Br, 6.45% N and 4.76% P. The product is an 89% yield of hexa-n-propylphosphorous triamide tetrabromide. Debromination of this product was effected by adding 100 ml. of 1-octene to 65.1 g. (0.10 mole) of the solid and heating on a steam bath until the orange color was discharged (about 20 minutes). The insoluble solid present was filtered off, washed with 50 ml. portions of anhydrous ether, and dried to give 49 g. of hygroscopic colorless solid. It is a quantitative yield of tris(dipropylamido)bromophosphonium bromide.

Attempts were made to prepare $[(n-C_3H_7)_2N]_3PCl_2$ by the chlorination of tris-(dipropylamino)-phosphine. The product isolated was a hygroscopic white solid melting at 60–62° C. and was found by analysis to contain 49.2% C, 9.79% H, 22.8% Cl, 9.58% N and 7.07% P. Calculated values for $C_{18}H_{42}N_3PCl_2$ are 53.73% C, 10.52% H, 17.63% Cl, 10.44% N and 7.72% P and for $C_{18}H_{42}N_3PCl_3$ are 49.3% C, 9.62% H, 24.4% Cl, 9.62% N, and 7.10% P. The product is not the desired tris(dipropylamido)-chlorophosphonium chloride but rather one containing three chlorine atoms. It is concluded that such a chlorophosphonium chloride is not readily made by chlorination.

(C) *Method of reactions 1 and 4.*—Preparation of tris(dipropylamido)chlorophosphonium iodide, $$(Pr_2N)_3P^+Cl \cdot I^-$$

To a cooled solution of 606 g. (6.0 moles) of dry di-n-propylamine in 600 ml. of dry benzene was added 208 g. (1.0 mole) of phosphorus pentachloride portionwise over a period of 2 hours with the temperature maintained at 10°–20° C. After stirring overnight at room temperature, the reaction mixture was filtered to remove 270 g. of the amine hydrochloride. The benzene filtrate was extracted with 1 l. of water and then with 0.5 l. of water. The aqueous solution contains $(Pr_2N)_3P^+Cl \cdot Cl^-$. This compound hydrolyzes slowly at ambient temperatures. For example, a solution neutralized to the neutral point with a base hydrolyzed to the extent of 17% in 2 days.

These aqueous extracts were combined and there was added to this aqueous solution 332 g. (2.0 moles) of potassium iodide. A precipitate immediately formed and it was collected by filtration, washed with water then with ether and dried in a vacuum oven to give 429 g. of colorless solid. It is an 87% yield of tris(dipropylamido)chlorophosphonium iodide.

(D) *Method of reaction 5.*—Preparation of tris(dipropylamido)fluorophosphonium iodide, $$(Pr_2N)_3P^+F \cdot I^-$$

To a solution of 7.0 g. (0.0142 mole) of tris(dipropylamido)chlorophosphonium iodide in 100 ml. of dry methanol was added 2.54 g. (0.02 mole) of silver fluoride and the mixture was heated to 50° C. for 1 hour. The insoluble solid was filtered off and the filtrate was concentrated to give a waxy residue. The residue was dissolved in 80 ml. of water and extracted with ether. To the aqueous solution was added 20 g. (0.133 mole) of sodium iodide and a yellow solid precipitated. The product was separated, washed with water and then with ether to give 5 g. of nearly colorless solid. This was recrystallized from ethyl acetate to give 4 g. of colorless platelets which is a 59% yield of tris(dipropylamido)fluorophosphonium iodide.

The following Table I lists typical preparations of halophosphonium salts.

TABLE I.—PREPARATIONS

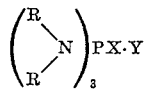

| Example | R= | X= | Y= | Procedure of Reaction | Melting Point (° C.) | Empirical Formula | Element | Percent Found | Percent Calcd. |
|---|---|---|---|---|---|---|---|---|---|
| 1 | $C_3H_7$ | Cl | Cl | 1 or 2 | | $C_{18}H_{42}Cl_2N_3P$ | | | |
| 2 | $C_3H_7$ | Br | Br | 3 | 115 | $C_{18}H_{42}Br_2N_3P$ | Br / N / P | 33.52 / 8.39 / 6.40 | 32.55 / 8.55 / 6.31 |
| 3 | $C_3H_7$ | I | I | 3 | 186–187 (dec.) | $C_{18}H_{42}I_2N_3P$ | I / N / P | 43.39 / 6.97 / 5.12 | 43.65 / 7.23 / 5.38 |
| 4 | $C_3H_7$ | Cl | I | 4 | 155–158 | $C_{18}H_{42}ClIN_3P$ | I / N / P | 25.89 / 8.28 / 6.15 | 25.69 / 8.51 / 6.27 |
| 5 | $C_3H_7$ | Br | I | 4 | 160 (dec.) | $C_{18}H_{42}BrIN_3P$ | I / N / P | 23.79 / 8.13 / 5.82 | 23.57 / 7.81 / 5.75 |
| 6 | $C_3H_7$ | Cl | $BF_4$ | 4 | 147–149 | $C_{18}H_{42}BClF_4N_3P$ | N / P | 9.14 / 6.63 | 9.26 / 6.82 |
| 7 | Allyl | Cl | I | 4 | 67–70 | $C_{18}H_{30}ClIN_3P$ | I / N / P | 26.13 / 8.65 / 6.69 | 26.34 / 8.27 / 6.43 |
| 8 | $C_3H_7$ | F | I | 5 | 138–140 | $C_{18}H_{42}FIN_3P$ | I / N / P | 26.51 / 8.83 / 7.26 | 26.57 / 8.79 / 6.49 |
| 9 | The 2 R's together= —(CH$_2$)$_5$— | Cl | $BF_4$ | 4 | 89–90 | $C_{15}H_{30}BClF_4N_3P$ | N / P | 10.93 / 8.14 | 10.36 / 7.64 |

It is apparent from the foregoing that the active compounds of this invention may be represented by the formula

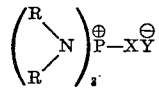

wherein R, X and Y are as previously defined.

The compounds of this invention are useful in plant growth regulation. They find particular utility as herbicides and exhibit excellent post-emergence activity on a variety of monocotyledonous and dicotyledonous weeds.

For use as herbicides these halophosphonium salts should be applied in an amount sufficient to exert the desired herbicidal action. For practical purposes this in the range of 0.5 to 20 lb./a. of the active ingredient, usually 0.5 to 10 lb./a., and preferably 1 to 6 lb./a.

For the practical use of the halophosphonium salts of this invention as herbicides, it is desirable to formulate them and subsequently to extend them for application. They may be formulated in a liquid form, such as in an emulsion concentrate, or in a solid preparation, such as wettable powder, dust or granular formulation by the use of an agronomically acceptable carrier. By agronomically acceptable carrier is meant any substance which can be used to dissolve, disperse or diffuse the chemical which is contained therein without impairing the effectiveness of the toxic agent and which does not do any permanent damage to such environment as soil, equipment and agronomic crops. For ultimate use, emulsion concentrates and wettable powders are extended with water and dusts and granular formulations may be extended with inert solid carriers. The extended materials may be applied to an area to be protected from weeds as either pre- or post-emergence herbicides in any manner desired as in an air stream or in an aqueous spray or with granular applicator. Extended solid formulations containing 1 to 20% of the toxicants or liquid sprays containing 0.1 to 10% may be conveniently used. The choice of concentration and rate of application in any given situation will depend on several factors, such as the state of growth of the vegetation present, the type of herbicidal composition used and the method of application.

Emulsion concentrate formulations may be made by dissolving the compounds of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvent. Useful solvents include toluene, xylene, napthtas, perchloroethylene, cyclohexanone, isophorone and dimethylformamide or mixtures thereof. The preferred solvents are in the aromatic hydrocarbon and ketone classes. Mixtures of solvents are commonly employed. The surfactants useful as emulsifying agents may constitute about 0.5 to 10% by weight of the emulsion concentrate and may be anionic, cationic or non-ionic in character. Non-ionic surfactants are preferred. Anionic surfactants include alcohol sulfates or sulfonates, alkylarene sulfonates or sulfosuccinates, such as calcium dodecylbenzenesulfonate or sodium dioctyl sulfosuccinate. Cationic surfactants include fatty acid alkyl amine salts and fatty acid alkyl quaternaries, such as laurylamine hydrochloride or lauryldimethylbenzylammonium chloride. Non-ionic emulsifying agents which may be used include ethylene oxide adducts of alkylphenols, fatty alcohols, mercaptans or fatty acids, such as polyethylene glycol esters of stearic acid or polyethylene glycol ethers of palmityl alcohol or of octyphenol having from about 7 to 100 ether groups. The concentration of the active ingredients may vary from 10 to 80%, but is preferably in the range of 25 to 50%.

A typical example of an emulsion concentrate is—

Example 10

A blend is made of the following materials:

Parts by wt.
Tris(dipropylamido)bromophosphonium bromide --- 25
Isooctylphenoxypolyethoxyethanol ---------------- 10
Dimethylformamide ------------------------------ 65

Wettable powder formulations are made by incorporating the halophosphonium salts in an inert, finely divided solid carrier and a surfactant which may be one or more emulsifying, wetting, dispersing or spreading agent or blends of these. The compounds are usually present in the range of 10 to 80% by weight and the surfactants in from 0.5 to 10% by weight. Solid carriers commonly used for blending with these compounds may be found in the classes of naturally occurring clays, silicates, silicas, limes and carbonates and of organic carriers. Typical of these are kaolin, fuller's earth, talc, diatamaceous earth, magnesium lime, dolomite, walnut shell flour, tobacco dust and sawdust. Commonly used emulsifying and wetting agents include polyoxyethylated alkylphenols, fatty alcohols, fatty acids and alkylamines, alkylarene sulfonate and dialkyl sulfosuccinates; spreading agents include such materials as glycol mannitan laurate and a condensate of polyglycerol and oleic acid modified with phthalic anhydride; and dispersing agents include such materials as the sodium salt of the copolymer of maleic anhydride and an olefin, such as diisobutylene, sodium lignin sulfonate and sodium formaldehyde-naphthalene sulfonates.

A typical example of a wettable powder is—

Example 11

A blend is made of the following materials:

Parts by wt.
Tris(dipropylamido)chlorophosphonium iodide ----- 50
Agricultural grade of a diatomaceous earth -------- 45
A solid surfactant containing 40% by weight of octylphenoxypolyethoxyethanol having 10 ether units and 60% by weight of magnesium carbonate. The product is then further blended in a micropulverizer -- 5

Solid compositions in the form of dusts are made by mixing the compounds of this invention with inert carriers conventially employed for the manufacture of pesticidal dusts for agricultural use, such as talcs, finely particled clays, pyrophyllite, diatomaceous earth, magnesium carbonate or flours, such as soyabean, wood, wheat, cottonseed and walnut shell. Dust concentrates in which the compounds are present in the range of 20 to 80% are commonly made and these are subsequently extended with additional solid to about 1 to 20% for ultimate application as herbicides.

A typical example of a dust concentrate is—

Example 12

The following are introduced into a mixing vessel and thoroughly mixed.

Parts by wt.
Tris(piperidinyl)chlorophosphonium tetrafluoborate  40
Dusting talc ----------------------------------- 60

Granular formulations are made by incorporating the halophosphonium salts of this invention into granular or pelletized forms of agronomically acceptable carriers, such as granular clays, vermiculite, charcoal, ground corn cobs or bran in a range of sizes from 8 to 60 mesh (United States standard sieve series sizes). Such granular formulations may be made to contain the phosphoric triamide derivatives in from 1 to 50% by weight.

A typical example of a granular formulation was made as follows:

Example 13

Parts by wt.
Tris(dipropylamido)fluorophosphonium iodide ----- 10
This was dissolved in the minimum amount of
  acetone and the solution added to Vermiculite
  (30–60 mesh size) -------------------- 90

The product was thoroughly blended in a mixer using a stream of nitrogen as the acetone was evaporated off.

A standard greenhouse procedure for comparing the herbicidal activity of compounds was one method used for the evaluation of the compounds examined for this invention. This method comprises planting crop and weed seeds in soil in flats, allowing the seeds to germinate and the seedlings to develop and treating the resulting plants with an aqueous spray of the test compound about 2 weeks after the seeds are planted. The sprays are applied at a standard carrier rate of about 50 gallons per acre and the concentration is varied to give desired dosages, such as from 1 to 10 lb./a. About 2 weeks after application of the herbicidal agents, the state of growth and the phytotoxic effects are evaluated. This type of test constitutes a post-emergence one; a similar test wherein the test compounds are applied to the soil immediately after the seeds are planted is a pre-emergence test.

Monocotyledonous species (abbreviated "Mono" in Tables II and III) used in these studies included crabgrass (*Digitaria sanguinalis*), millet (*Setaria italica*), wild oats (*Avena fatua*), orchardgrass (*Dactylis glomeratus*), ryegrass (*Lolium multiflorum*), sudangrass (*Sorghum sudanensis*), and wheat (*Triticum vulgare*).

Dicotyledonous species (abbreviated "Di" in Tables II and III) used included chickweed (*Stellaria media*), curly dock (*Rumex crispus*), flax (*Linum usitatissimum*), velvetleaf (*Abutilon theophrasti*), lambsquarters (*Chenopodium album*), mustard (*Brassica kaber*), pigweed (*Amaranthus* spp.), sorrel (*Rumex* spp.) and wild carrot (*Daucus carota*).

Results are recorded in Table II for the average percent kill of all plants involved when the compounds were applied at a dosage of 10 pounds per acre and in Table III at 3 pounds per acre.

TABLE II
[Herbicidal Data (10 Lbs./Acre)]

| Example (See Table I) | Average Percent Kill | | | |
|---|---|---|---|---|
| | Post-Emergence | | Pre-Emergence | |
| | Mono | Di | Mono | Di |
| 1 | 100 | 70 | 15 | 65 |
| 2 | 100 | 100 | 5 | 17 |
| 3 | 100 | 75 | 0 | 0 |
| 4 | 100 | 100 | 70 | 90 |
| 5 | 100 | 100 | 0 | 0 |
| 6 | 70 | 97 | 30 | 45 |
| 7 | 75 | 97 | 0 | 0 |
| 8 | 85 | 87 | 17 | 5 |
| 9 | 50 | 97 | 0 | 0 |

TABLE III
[Herbicidal Data (3 Lbs./Acre)]

| Example (See Table I) | Average Percent Kill | | | |
|---|---|---|---|---|
| | Post-Emergence | | Pre-Emergence | |
| | Mono | Di | Mono | Di |
| 1 | 87 | 100 | 0 | 30 |
| 2 | 80 | 93 | 0 | 0 |
| 3 | 58 | 76 | 0 | 0 |
| 4 | 84 | 98 | 15 | 42 |
| 5 | 91 | 93 | 4 | 4 |
| 6 | 6 | 46 | 0 | 0 |
| 7 | 37 | 73 | 0 | 0 |
| 8 | 16 | 70 | 0 | 0 |
| 9 | 24 | 80 | 0 | 0 | pounds. The surfactants may be added in the formulation or to the spray mixture, for example in the spray tank, that is to be applied to the area for which weed control is desired.

The increase in herbicidal activity due to the presence of surfactants was demonstrated in a field test wherein the herbicidal compound evaluated was Example No. 4—tris(dipropylamido)chlorophosphonium iodide and the surfactants used were—

Surfactant A—tert-octylphenoxy-polyethoxyethanol
Surfactant B—n-$C_7$-$C_9$-alkylphenoxy-polyethoxyethanol
Surfactant C—dodecyl ether of polyethylene glycol
Surfactant D—dioctyl sodium sulfosuccinate For the test, corn (*Zeal maize*) and millet (*Setaria italica*) were planted and the crops and weeds allowed to grow for 29 days. At that time the corn was 12–18 inches high and the millet 8–10 inches high. The major weeds persent were crabgrass (*Digitaria sanguinalis*), pigweed (*Amaranthus* spp.), purslane (*Portulaca oleracea*) and ragweed (*Ambrosia* spp.). Blanket post-emergence treatments were then made with the phosphoric triamide derivatives alone and in combination with the surfactants. The treatments were applied as aqueous sprays at a rate of 50 gallons per acre. Crop injury and weed evaluations were made 11, 20 and 29 days after treatment. The results are given in Table IV (Monocots refer to monocotyledonous weeds, and Dicots to dicotyledonous weeds).

TABLE IV.—HERBICIDAL ACTIVITY WITH AND WITHOUT SURFACTANTS

| Treatments | Lb. Active per Acre | Percent Injury—Days After Treatment | | | | | | | | | | | |
|---|---|---|---|---|---|---|---|---|---|---|---|---|---|
| | | Corn | | | Millet | | | Monocots | | | Dicots | | |
| | | 11 | 20 | 29 | 11 | 20 | 29 | 11 | 20 | 29 | 11 | 20 | 29 |
| Example No. 4 | 1 | 33 | 30 | 13 | 40 | 25 | 23 | 67 | 48 | 54 | 75 | 50 | 57 |
| Do | 4 | 80 | 60 | 47 | 63 | 40 | 27 | 62 | 50 | 48 | 75 | 45 | 58 |
| Example No. 4 plus Surf. A | 1+0.25 | 47 | 35 | 20 | 37 | 30 | 13 | 53 | 55 | 43 | 70 | 20 | 58 |
| Do | 1+2 | 70 | 70 | 43 | 30 | 25 | 13 | 68 | 50 | 42 | 77 | 30 | 53 |
| Do | 1+4 | 83 | 85 | 77 | 70 | 55 | 37 | 78 | 45 | 52 | 77 | 50 | 62 |
| Do | 1+8 | 90 | 80 | 77 | 73 | 55 | 47 | 70 | 40 | 55 | 77 | 25 | 52 |
| Example No. 4 plus Surf. B | 1+4 | 77 | 85 | 77 | 57 | 60 | 63 | 68 | 50 | 47 | 68 | 65 | 73 |
| Example No. 4 plus Surf. C | 1+4 | 77 | 75 | 60 | 67 | 50 | 50 | 61 | 45 | 37 | 57 | 55 | 70 |
| Example No. 4 plus Surf. D | 1+4 | 87 | 70 | 70 | 77 | 65 | 57 | 73 | 58 | 62 | 81 | 77 | 78 |

The data in Tables II and III demonstrate outstanding post-emergence activity for the compounds of this invention. In this series of tris(dialkylamido)halophosphonium salts there is essentially no herbicidal activity for those compounds where the alkyl group is methyl or octyl. The peak of activity occurs when the size of the alkyl group is in the three to four carbon range, i.e. propyl or butyl. The preferred compounds from the viewpoint of ease of isolation of the compounds combined with excellent herbicidal properties are the chloro- and bromophosphonium iodides.

The activity of the phosphoric triamide derivatives of this invention can be enhanced by the use of high levels of surfactants. Surfactants effective for this purpose include (1) the non-ionics, particularly the ethylene oxide adducts of alkylphenols wherein the alkyl group has a carbon content in the range of six to eighteen carbon atoms and the number of ether groups is from 5 to 50 units, and the dodecyl ether of polyethylene glycol, and (2) the dialkyl sodium sulfosuccinates wherein the alkyl groups have a carbon content of from six to eighteen carbon atoms.

The amount of surfactant (based on 100% active ingredient) to add to the phosphoric triamide derivatives to produce improved herbicidal performance is from one-fourth to eight times the weight of these herbicidal com- Corn and millet are crop plants, but in this case represent a reliable measure of herbicidal activity. It will be seen from Table IV that considerable enhancement of activity with Example No. 4 is achieved when as little as one-fourth pound of the surfactant is used with one pound of the chemical. When 2 to 8 pounds of the surfactant are used with one pound of the chemicl, herbicidal activity comparable to that of 4 pounds of the chemical alone is achieved. These results are typical of the other compounds of this invention.

The phosphoric triamide derivatives of this invention are also useful for the desiccation of crop plants and as plant defoliants. Field tests conducted with formulations of Example No. 4 gave excellent results for potato vine killing at 3 and 6 pounds of the active ingredients per acre and compared favorably with sodium arsenite at 8 pounds per acre.

We claim:
1. A compound of the formula

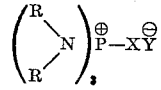

wherein:
R is alkyl of 2 to 6 carbon atoms or alkenyl of 2 to 6 carbon atoms,

X is selected from the group consisting of chloro, bromo, iodo and fluoro, and

Y is selected from the group consisting of chloro, bromo and iodo.

2. The compound tris(dipropylamido)chlorophosphonium chloride.

3. The compound tris(dipropylamido)chlorophosphonium iodide.

4. The compound tris(diallylamido)chlorophosphonium iodide.

References Cited

UNITED STATES PATENTS

| | | |
|---|---|---|
| 2,146,584 | 2/1939 | Lipkin. |
| 2,786,075 | 3/1957 | Krau et al. |
| 3,300,503 | 1/1967 | Schutzler. |

OTHER REFERENCES

Rydon et al., "J. Chem. Soc.," (1957) pp. 4682–3, QD1C6.

Michaelis et al., "Per. Dept. Chem.," vol. 28, (1895), pp. 2205 to 2211, QD1D4.

Michaelis, "Per. Dept. Chem.," vol. 31, (1898), pp. 1037 to 1047, QD1D4.

LEON ZITVER, Primary Examiner

J. E. EVANS, Assistant Examiner

U.S. Cl. X.R.

71—71, 86; 260—293, 313